United States Patent [19]

Takakura et al.

[11] Patent Number: 5,313,226
[45] Date of Patent: May 17, 1994

[54] IMAGE SYNTHESIZING APPARATUS

[75] Inventors: Masaki Takakura, Higashi-Osaka; Yasukuni Yamane, Shiki; Noritoshi Kako, Nara, all of Japan

[73] Assignee: Sharp Kabushiki Kaisha, Osaka, Japan

[21] Appl. No.: 59,346

[22] Filed: May 11, 1993

Related U.S. Application Data

[63] Continuation of Ser. No. 704,976, May 24, 1991, abandoned.

[30] Foreign Application Priority Data

Jun. 4, 1990 [JP] Japan ............... 2-145638

[51] Int. Cl.⁵ .............................................. G09G 1/28
[52] U.S. Cl. .................................... 345/115; 345/199
[58] Field of Search ............... 340/703, 721, 723, 734, 340/744, 747; 358/783, 105, 188, 22; 345/115, 116, 118, 119, 150, 155, 189, 190, 199

[56] References Cited

U.S. PATENT DOCUMENTS

| | | | |
|---|---|---|---|
| 4,439,783 | 3/1984 | Nishikawa | 358/183 |
| 4,639,721 | 1/1987 | Eto et al. | 340/703 |
| 4,682,297 | 7/1987 | Iwami | 340/734 |
| 4,827,253 | 5/1989 | Maltz | 340/703 |
| 4,855,831 | 8/1989 | Miyamoto et al. | 340/721 |
| 4,868,552 | 9/1989 | Chang | 340/703 |
| 4,908,780 | 3/1990 | Priem et al. | 340/744 |
| 4,954,819 | 9/1990 | Watkins | 340/721 |
| 4,992,781 | 2/1991 | Iwasaki et al. | 340/747 |
| 5,018,179 | 5/1991 | Kaneko | 358/105 |
| 5,083,257 | 1/1992 | Kennedy | 340/703 |
| 5,091,717 | 2/1992 | Carrie et al. | 340/721 |

Primary Examiner—Alvin E. Oberley
Assistant Examiner—Steven J. Saras
Attorney, Agent, or Firm—Nixon & Vanderhye

[57] ABSTRACT

An image synthesizing apparatus includes a first storage unit for storing first image data, a second storage unit for storing second image data, a third storage unit for storing data of a synthesizing ratio of the first image data to the second image data, a selective unit for selectively outputting at least the lower bits of the first and second image data based on the synthesizing ratio, and a synthesizing unit for synthesizing the image data selected by the selective unit and outputting the synthesized image data. The selective unit is connected to the first, second and third storage unit, and the synthesizing unit is connected to the selective unit.

9 Claims, 4 Drawing Sheets

IMAGE SYNTHESIZING APPARATUS

This is a continuation of application Ser. No. 07/704,976, filed May 24, 1991, now abandoned.

BACKGROUND OF THE INVENTION

1. Field of the Invention

The present invention relates to an image synthesizing apparatus which is capable of synthesizing two or more images.

2. Description of the Related Art

An image synthesizing apparatus has been used for synthesizing two or more images. The image synthesizing apparatus normally performs the synthesizing of two images on the basis of the following equation (1):

$$P \times a + Q \times (1-a) \quad (0 \leq a \leq 1) \tag{1}$$

where P and Q denote image data, respectively, and $a$ is a constant between 0 and 1.

The actual synthesizing of two images based on the equation (1) requires the image synthesizing apparatus which is capable of manipulating a very large volume of image data. It means that the apparatus has to perform the operation quite rapidly. For the purpose, the apparatus employs a look-up table.

The known image synthesizing apparatus using the equation (1) will be described below.

The image synthesizing apparatus includes two image memories for storing respective image data P and Q, a control memory for storing the constant $a$, a look-up table for storing conversion values for synthesizing the input image data and for outputting the conversion value corresponding to the image data P, Q and the constant $a$ as an address, a digital-to-analog converter for converting the input digital conversion value into an analog value, and a display unit for displaying a synthesized image on the basis of the converted analog value. Because the conversion values stored in the look-up table are pre-calculated by the equation (1), it results in realizing the rapid operation for synthesizing images.

According to the construction, the image data P and Q and the constant $a$ are read from the image memories and the control memory, respectively, and are input to the look-up table. In the look-up table, the conversion values pre-calculated by the equation (1) are stored. Then, the look-up table sends the digital conversion value corresponding to the input image data P and Q and constant $a$ to the digital-to-analog converter in which the conversion data is converted into the analog data. Then, the converted analog data is sent to the display unit on which the synthesized image based on the analog data is displayed.

The foregoing image synthesizing apparatus known by the present inventors, however, is required to input the image data P and Q and the constant $a$ to the look-up table at the same time. It means that the look-up table has to have a large storage capacity.

Assume that each tone number of the image data P and Q has eight (8) bits and the constant $a$ has four (4) bits. It results in the look-up table receiving overall data of 20 bits. That is, the capacity of the look-up table is substantially as large as an image memory composed of $1024 \times 1024$ bits. The look-up table needs a long duration of time for setting the conversion values for synthesizing the input image data to the table itself. The setting time is substantially as long as the time in case that the image data stored in the image memories are directly converted with the conversion values calculated by the equation (1). The long setting time loses the merit of the look-up table.

It is possible to restrict the number of bits of the data to be input to the look-up table for reducing the storage capacity of the look-up table. The resulting image of the image synthesizing apparatus, however, is made inferior in quality.

SUMMARY OF THE INVENTION

It is therefore an object of the present invention to provide an image synthesizing apparatus which is capable of reducing the storage capacity of the look-up table without having to make the quality of image inferior.

The object of the present invention can be achieved by the image synthesizing apparatus including:

a first storage unit for storing first image data;

a second storage unit for storing second image data;

a third storage unit for storing data of a synthesizing ratio of the first image data to the second image data;

a selective unit for selectively outputting at least the lower bits of the first and second image data based on the synthesizing ratio; and a synthesizing unit for synthesizing the image data selected by the selective unit and outputting the synthesized image data.

The selective unit is connected to the first, second and third storage unit, and the synthesizing unit is connected to the selective unit.

In operation, the first storage means stores the first image data. The second storage means stores the second image data. The third storage means stores a synthesizing ratio of the first image data to the second image data on the synthesized image. It results in removing the time taken in setting the conversion values for image data to the look-up table. The first and the second storage means serve to output at least the lower-rank bits of the image data to the look-up table according to the synthesizing ratio stored in the third storage means. It results in reducing the overall storage capacity of the look-up table and suppressing the lowering of image quality in synthesizing the two image data.

Further objects and advantages of the present invention will be apparent from the following description of the preferred embodiments of the invention as illustrated in the accompanying drawings.

DESCRIPTION OF THE PREFERRED EMBODIMENTS

An embodiment of the present invention will be described an image synthesizing apparatus with reference to the drawings.

Figure 1:
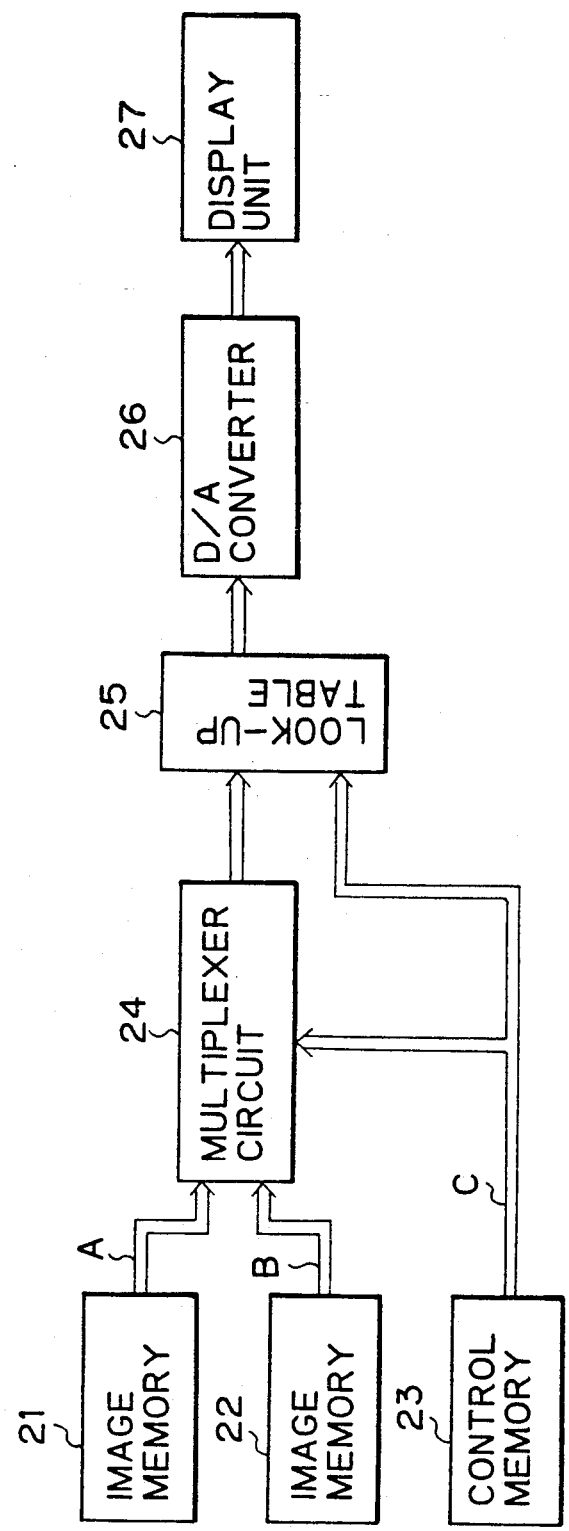
FIG. 1 is a block diagram showing an image synthesizing apparatus according to a first embodiment of the present invention.

FIG. 1 is a block diagram showing an image synthesizing apparatus according to a first embodiment of the present invention.

As shown in FIG. 1, the image synthesizing apparatus includes an image memory 21 for storing image data A, an image memory 22 for storing image data B, and a control memory 23 for storing data $\beta$ about a synthesizing ratio of the image data A to the image data B on a synthesized image. The image synthesized apparatus further includes a multiplexer circuit 24 for selectively outputting at least the lower-rank bits of the image data A and B, a look-up table 25 for synthesizing the image data selected by the multiplexer circuit 24 and for outputting the synthesized result, a digital-to-analog (D/A) converter 26 for converting the digital synthesized signal sent from the look-up table 25 into an analog signal, and a display unit 27 for displaying the image based on the analog signal.

The image memory 21, the image memory 22, and the control memory 23 are connected to the multiplexer circuit 24. The multiplexer circuit 24 is connected to the look-up table 25, and the control memory 23 is connected to the look-up table 25.

The image data A is composed of 8-bit signals A7 to A0 and the image data B is composed of 8-bit signals B7 to B0 as will be described later with respect to FIG. 2.

The look-up table 25 stores the conversion values for synthesizing the image data, and the conversion values are calculated in advance by the following equation (2):

$$A \times \beta + B \times (1-\beta) \quad (0 \leq \beta \leq 1) \tag{2}$$

where A and B denote the image data stored in image memories 21 and 22, respectively, and $\beta$ denotes the data about the synthesizing ratio of the image data A to the image data B on the synthesized image.

In case that the synthesizing ratio is kept uniform on the overall image, the data $\beta$ is stored in the control memory 23 as the same constant and is multiplied by all the pixel values of the image data A and B. In case that the synthesizing ratio is kept variable on each image area, the data $\beta$ for each image area is stored in the corresponding addresses of the control memory 23.

Figure 2:
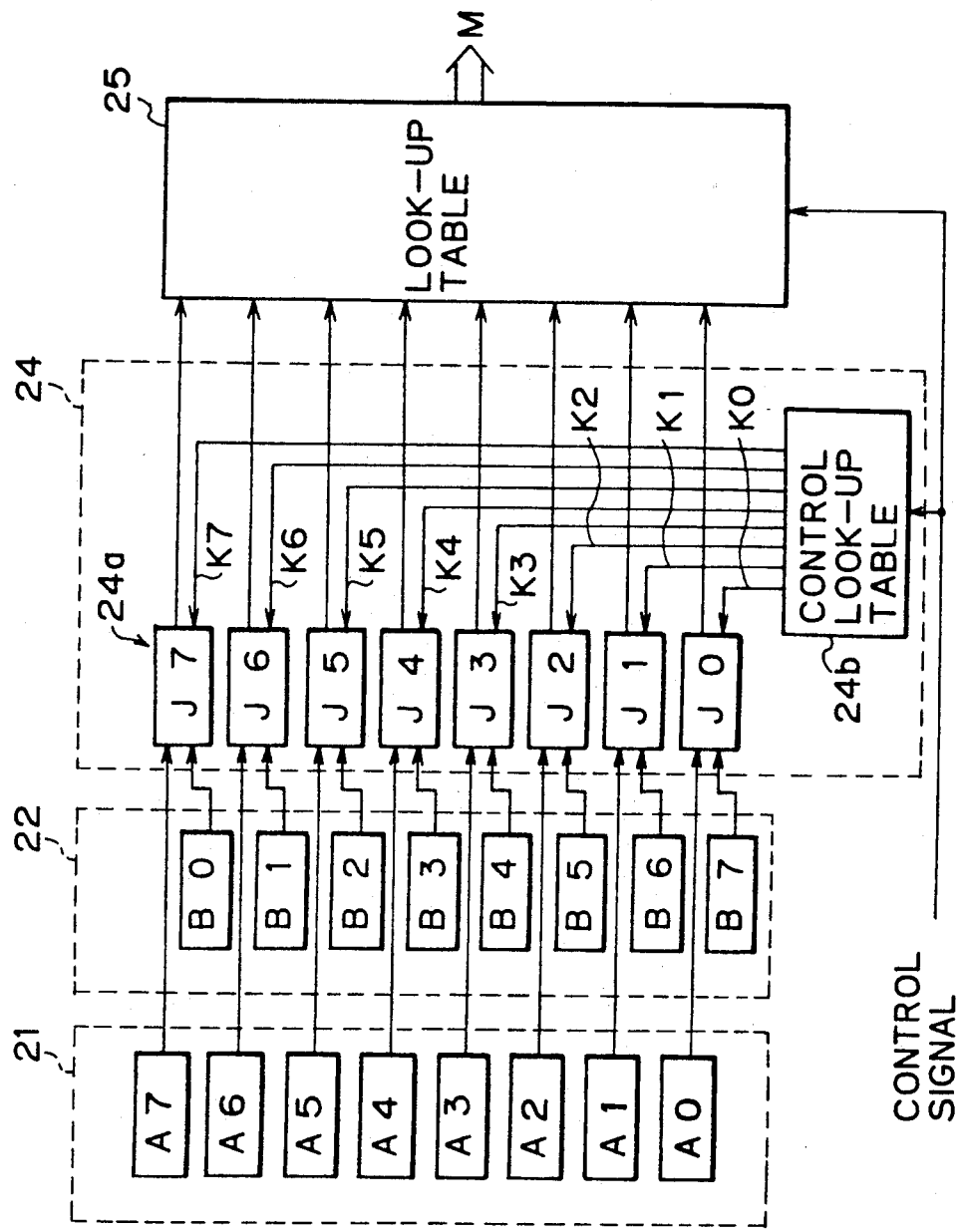
FIG. 2 is a block diagram showing a multiplexer circuit included in the image synthesizing apparatus shown in FIG. 1.

FIG. 2 is a block diagram showing the multiplexer circuit included in the image synthesizing apparatus shown in FIG. 1.

As shown in FIG. 2, the multiplexer circuit 24 includes multiplexers 24a and a control look-up table 24b. The multiplexers 24a consist of multiplexers J0 to J7, and the multiplexers J0 to J7 selectively output either one of both bits, that is, the highest bit A7 of the image data A stored in the image memory 21 or the lowest bit B0 of the image data B stored in the image memory 22, the second highest bit A6 of the image data A or the seventh bit B1 of the image data B, ..., and the lowest A0 of the image data A or the highest bit B7 of the image data B. The multiplexers J0 to J7 output the selected signals to the look-up table 25 in response to the switch control signals K0 to K7 sent from the control look-up table 24b.

Next, the operation of image synthesizing apparatus will be described with reference to FIGS. 1 and 2.

As shown in FIG. 1, assume that control data C stored in the control memory 23 is an integral and the synthesizing ratio $\beta$ of the image data A and B can be obtained by dividing the control data C by the maximum control data Cm base on the equation (3);

$$\beta = C/Cm \tag{3}$$

In the assumption, the image data A and B are synthesized on the basis of the equation (4);

$$(A \times C + B \times (Cm - C))/Cm \tag{4}$$

Assuming that error of the image data A and B are $\delta a$ and $\delta b$ bit, respectively, the error given in the equation (4) can be obtained by the following equation (5);

$$(2^{\delta a} \times C + 2^{(D-\delta a)} \times (Cm - C))/Cm \tag{5}$$

where $\delta a + \delta b = D$ (D is a constant.).

The value $\delta a$ minimizing the error of equation (4) to the given control data C can be easily obtained by the calculation. Hence, the present embodiment is arranged to control the multiplexer circuit 24 on the basis of the equation (5).

Each of the image data A and B is 8-bit data. Hence, the selection of the multiplexer circuit 24 results in loosing the totally 8-bit data (D=8). Thus, it is necessary to grasp how many bits of each image data are truncated by obtaining the value of $\delta a$ minimizing the value of the equation (5).

Assuming that the control data C is 4-bit data, that is, $0 \leq C \leq Cm = 15$, the values of $\delta a$ minimizing the value of the equation (5) are shown in Table 1 (rounded below decimal point to the whole number).

TABLE 1

| C | $\delta a$ | Minimum Value of Equation (5) |
|---|---|---|
| 0 | 8 | 1 |
| 1 | 6 | 8 |
| 2 | 5 | 11 |
| 3 | 5 | 13 |
| 4 | 4 | 16 |
| 5 | 4 | 16 |
| 6 | 4 | 16 |
| 7 | 4 | 16 |
| 8 | 4 | 16 |
| 9 | 4 | 16 |
| 10 | 4 | 16 |
| 11 | 4 | 16 |
| 12 | 3 | 13 |
| 13 | 3 | 11 |
| 14 | 2 | 8 |
| 15 | 0 | 1 |

As will be appreciated from the Table 1, for example, if C=0, all the eight (8) bits of the image data A are truncated. If C=1, the six (6) bits of the image data A and the two (2) bits of the image data B are truncated.

The number of bits to be selected from the image data A and B is shown in Table 2.

TABLE 2

| C | Image Data A | Image Data B |
|---|---|---|
| 0 | 0 | 8 |
| 1 | 2 | 6 |
| 2 | 3 | 5 |
| 3 | 3 | 5 |
| 4 | 4 | 4 |
| 5 | 4 | 4 |
| 6 | 4 | 4 |
| 7 | 4 | 4 |
| 8 | 4 | 4 |
| 9 | 4 | 4 |
| 10 | 4 | 4 |
| 11 | 4 | 4 |
| 12 | 5 | 3 |
| 13 | 5 | 3 |
| 14 | 6 | 2 |

TABLE 2-continued

| C | Image Data A | Image Data B |
|---|---|---|
| 15 | 8 | 0 |

Then, the control look-up table 24b (see FIG. 2) is arranged like Table 3 on the basis of the Table 2.

TABLE 3

| K Input | Setting of Bit Switching Signal | | | | | | | |
|---|---|---|---|---|---|---|---|---|
| | K0 | K1 | K2 | K3 | K4 | K5 | K6 | K7 |
| 0 | B7 | B6 | B5 | B4 | B3 | B2 | B1 | B0 |
| 1 | B7 | B6 | B5 | B4 | B3 | B2 | A6 | A7 |
| 2, 3 | B7 | B6 | B5 | B4 | B3 | A5 | A6 | A7 |
| 4, 5, 6, 7, 8, 9, 10, 11 | B7 | B6 | B5 | B4 | A4 | A5 | A6 | A7 |
| 12, 13 | B7 | B6 | B5 | A3 | A4 | A5 | A6 | A7 |
| 14 | B7 | B6 | A2 | A3 | A4 | A5 | A6 | A7 |
| 15 | A0 | A1 | A2 | A3 | A4 | A5 | A6 | A7 |

Next, the description will be directed to the look-up table 25.

In case that the input value to the look-up table 25 is assumed so that the control data C is the upper 4-bit data and the synthesizing bits of the image data A and B are the lower 8-bit data, the input value to the look-up table 25 is $C \times 2^8 + y$ ($0 \leq C \leq 15$, $0 \leq y \leq 255$). For this input value, the output value is represented as M indicated below.

In case of C=0, $$M = y,$$

in case of C=1, $$M = (y \text{ and } (255-3)) \times 14/15 + (rev(y) \text{ and } (255\text{-}63)) \times 1/15,$$

in case of C=2 and 3, $$M = (y \text{ and } (255\text{-}7)) \times (15\text{-}C)/15 + (rev(y) \text{ and } (255\text{-}31)) \times C/15,$$

in case of C=4, 5, 6, 7, 8, 9, 10, and 11, $$M = (y \text{ and } (255\text{-}15)) \times (15\text{-}C)/15 + (rev(y) \text{ and } (255\text{-}15)) \times C/15,$$

in case of C=12 and 13, $$M = (y \text{ and } (255\text{-}31)) \times (15\text{-}C)/15 + (rev(y) \text{ and } (255\text{-}7)) \times C/15,$$

in case of C=14, $$M = (y \text{ and } (255\text{-}63)) \times 1/15 + (rev(y) \text{ and } (255\text{-}3)) \times 14/15,$$

in case of C=15, $$M = rev(y),$$

where the above "and" denotes an operation of a logical product per each bit and the above "rev(y)" denotes a function of reversing the upper bits of y into the lower bits.

For the first term in case of C=1 to 14, the image data stored in the image memory 22 is multiplied by a mixing ratio (15-C). For the second term, the image data stored in the image memory 21 is multiplied by the mixing ratio C. As a result, the look-up table 25 is capable of outputting the value M given by synthesizing the image data A with B on the basis of the control data C.

As will be appreciated from the above, the image synthesizing apparatus according to the present embodiment is arranged so that the look-up table 25 has a 12-bit input value, which needs less capacity of the look-up table 25 than the foregoing related art which needs 20-bit input data.

Further, according to the present image synthesizing apparatus, the synthesizing error is greatly changed according to the value of the control data C as indicated in Table 1, however, in case that the ratio $\beta$ of the image data A is much different from the ratio $1\text{-}\beta$ of the image data B, the synthesizing error is reduced to a small value.

In particular, there is no error in the area displaying one of the image data A and B. It means that no error exists in case of synthesizing the portion of the image with the background image. Though the larger error exists in the border between the images, the error can be visually negligible.

Figure 3:
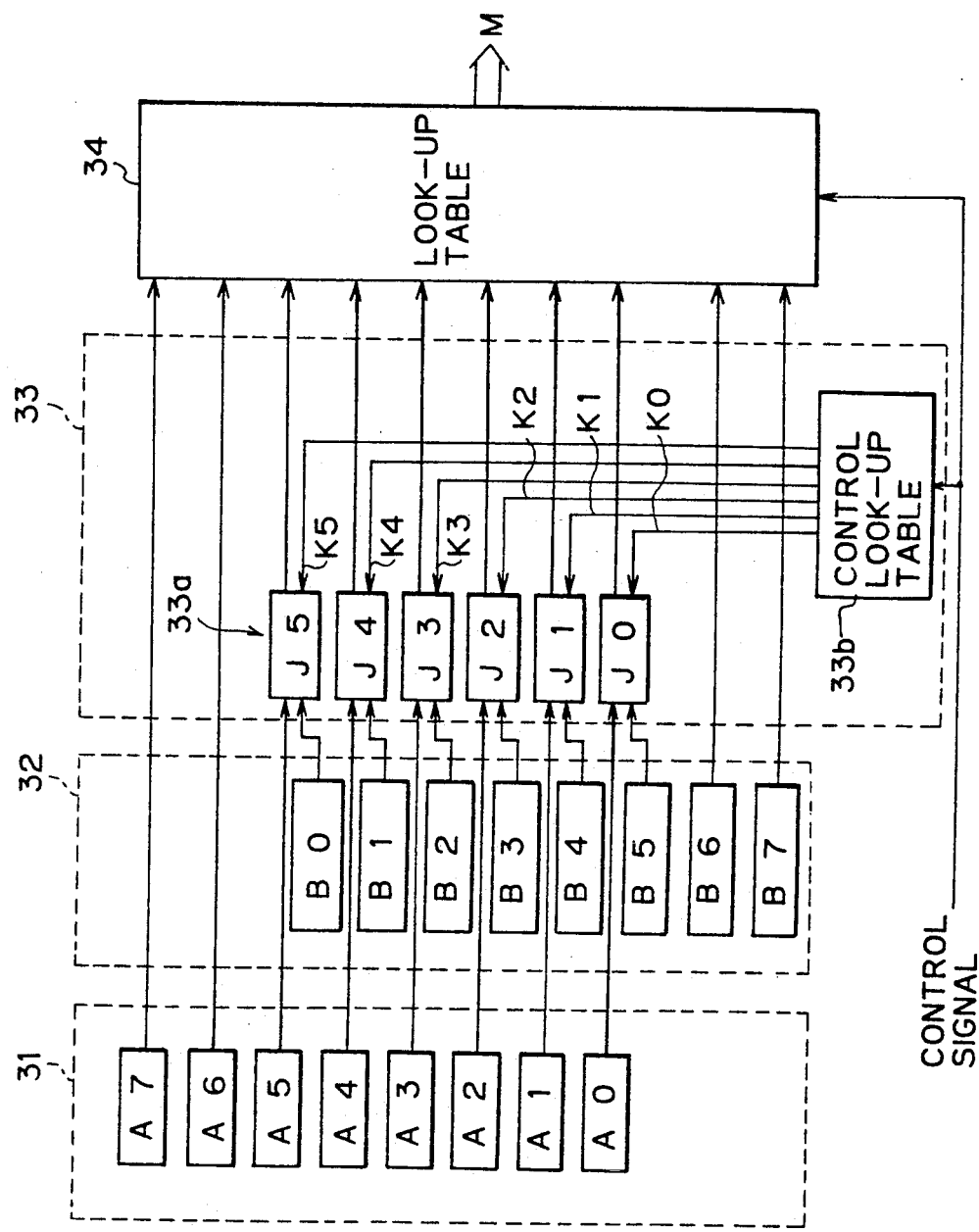
FIG. 3 is a block diagram showing an image synthesizing apparatus according to a second embodiment of the present invention.

FIG. 3 is a block diagram showing a second embodiment of the present invention.

As shown in FIG. 3, the image synthesizing apparatus according to the second embodiment includes an image memory 31 for storing image data A, an image memory 32 for storing image data B, and a control memory (not shown) for storing data $\beta$ about a synthesizing ratio of the image data A to the image data B on a synthesized image and outputting the data $\beta$ as a control signal. The image synthesized apparatus further includes a multiplexer circuit 33 for selectively outputting at least the lower-rank bits of the image data A and the image data B, a look-up table 34 for synthesizing the image data selected by the multiplexer circuit 33 and for outputting the synthesized result, a D/A converter (not shown) for converting the digital synthesized signal sent from the look-up table 34 into an analog signal, and a display unit (not shown) for displaying the image based on the analog signal.

The construction and operation of the control memory, the D/A converter and the display unit included in the second embodiment is the same as those of the control memory 23, the D/A converter 26 and the display unit 27 of the first embodiment.

The image data A is composed of 8-bit signals A7 to A0 and the image data B is composed of 8-bit signals B7 to B0.

The multiplexer circuit 33 includes multiplexers 33a and a control look-up table 33b. The multiplexers 33a are consisted of multiplexers J0 to J5, and the multiplexers J0 to J5 selectively output either one of both bits, that is, the third highest bit A5 of the image data A stored in the image memory 31 or the lowest bit B0 of the image data B stored in the image memory 32, the fourth bit A4 of the image data A or the seventh bit B1 of the image data B, ..., and the lowest A0 of the image data A or the third highest bit B5 of the image data B. The multiplexers J0 to J5 output the selected signals to the look-up table 34 in response to the switch control signals K0 to K5 sent from the control look-up table 33b.

The upper two bits A7 and A6 of the image data A and the upper two bits B7 and B6 of the image data B are arranged to be directly input to the look-up table 34 without selecting either one of both two bits.

This arrangement increases by two bits the number of bits to be input to the look-up table 34. Hence, this embodiment requires a larger storage capacity but provides a higher operating accuracy than the first embodiment.

The setting of the control look-up table 33b can be set by specifying D=6 in the equation (5) so that the lower six bits of the image data A and B are switched, and the look-up table 34 outputs output values M.

Figure 4:
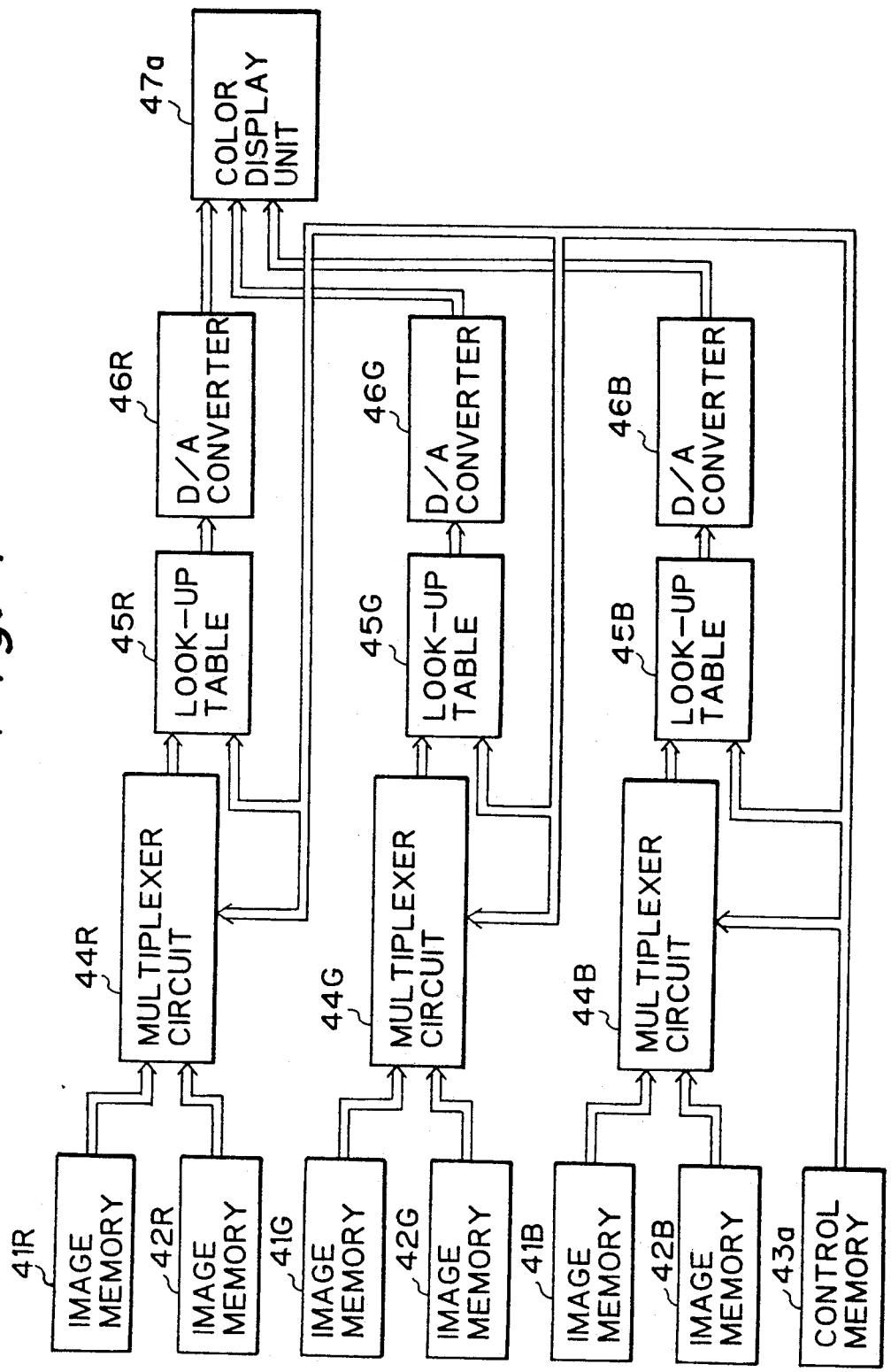
FIG. 4 is a block diagram showing an image synthesizing apparatus according to another embodiment of the present invention.

FIG. 4 is a block diagram showing an image synthesizing apparatus according to a third embodiment of the present invention.

The image synthesized apparatus according to the first and second embodiments are arranged to synthesize the monochrome image data A and B each composed of an 8-bit tone, however, the image synthesizing apparatus according to the third embodiment is constructed to be capable of synthesizing two color images.

As shown in FIG. 4, the image synthesizing apparatus according to the third embodiment includes image memories 41R and 42R for red, image memories 41G and 42G for green, image memories 41B and 42B for blue, a control memory 43a, multiplexer circuits 44R, 44G and 44B for red, green and blue, look-up tables 45R, 45G and 45B for red, green and blue, digital-to-analog (D/A) converters 46R, 46G and 46B for red, green and blue, and a color display unit 47a, which are all connected as shown in FIG. 4.

Image memories 41R and 42R store a first and a second image data for red, image memories 41G and 42G store a first and a second image data for green, and image memories 41B and 42B store a first and a second image data for blue. The control memory 43a stores each data about synthesizing ratio of the first image data to the second image data for red, green and blue. Each of the multiplexer circuits 44R, 44G and 44B, each of the look-up tables 45R, 45G and 45B, and each of the D/A converters 46R, 46G and 46B are constructed like the multiplexer circuit 24 or 33, the look-up table 25 or 34, and the D/A converter 26 in the first or second embodiment.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image synthesizing apparatus for synthesizing two images in a given ratio, the apparatus comprising:
a first storage means for storing first image data;
a second storage means for storing second image data;
a third storage means for storing data of a synthesizing ratio of said first image data to second image data;
a fourth storage means for storing a plurality of sets of bit selection data, the plurality of sets respectively corresponding to a plurality of synthesizing ratios, for selecting a part of bit data from the first image data and a part of bit data from the second image data so as to minimize a difference between an image synthesized in each of said synthesizing ratios by said first image data and said second image data as a whole, and an image synthesized by each of said synthesizing ratios by said part of bit data of said first image data and said part of bit data of said second image data, and for outputting one set of bit selection data corresponding to said stored synthesizing ratio in said third storage means;
a selecting means for selecting said part of bit data of said first image data and said part of bit data of said second image data on the basis of said one set of bit selection data outputted from said fourth storage means;
a synthesizing means stored with synthesized image data of said first image data to said second image data for all combination of said selected part of bit data and said synthesizing ratio, and for outputting said synthesized image data corresponding to said selected part of bit data and said synthesizing ratio stored in said third storage means; and
wherein said bit selection data stored in said fourth storage means is obtained by minimizing the following equation:

$$(2^{\delta a} \times C + 2^{(D-\delta a)} \times (Cm - C))/Cm$$

where $\delta a + \delta b = D$ (D is a constant),
$\beta = C/Cm$,
$\delta a$ denotes the error of the first image data,
$\delta b$ denotes the error of the second image data,
$\beta$ denotes the synthesizing ratio,
C denotes the control data,
Cm denotes the maximum control data.

2. An image synthesizing apparatus according to claim 1, wherein said apparatus comprises a digital-to-analog converter for converting a digital synthesized image data output into an analog value by said synthesizing means, and a display means for displaying an image on the basis of said analog value.

3. An image synthesizing apparatus according to claim 1, wherein each of said first, second, third and fourth storage means comprises a memory, and said selecting means comprises a multiplexer circuit.

4. An image synthesizing apparatus according to claim 3, wherein said multiplexer circuit comprises multiplexers adapted to select any one of said bit data for each of bits of said first image data and said second image data.

5. An image synthesizing apparatus according to claim 4, wherein each of said first and second image data stored in said first and second storage means comprises an 8-bit signal.

6. An image synthesizing apparatus according to claim 5, wherein said multiplexers are adapted to select either of the highest bit of said first image data or the lowest bit of said second image data, either of the second bit of said first image data or the seventh bit of said second image data, either of the third bit of said first image data or the sixth bit of said second image data, either of the fourth bit of said first image data or the fifth bit of said second image data, either of the fifth bit of said first image data or the fourth bit of said second image data, either of the sixth bit of said first image data or third bit of said second image data, either of the seventh bit of said first image data or the second bit of said second image data, and either of the lowest bit of said first image data or highest bit of the said second image data.

7. An image synthesizing apparatus according to claim 6, wherein said multiplexers are adapted to directly input upper two bits of said first image data and upper two bits of said second image data to said synthesizing means without any one of said first and said second image data.

8. An image synthesizing apparatus according to claim 1, wherein said first storage means includes three image memories for red, green and blue, said second storage means includes three images memories for red, green and blue, said selecting means includes three multiplexer circuits for red, green and blue, said synthesizing means includes three look-up tables for red, green and blue for synthesizing two color image data.

9. An image synthesizing apparatus for synthesizing two images in a given ratio, the apparatus comprising:
a first storage means for storing first image data;
a second storage means for storing second image data;
a third storage means for storing data of a synthesizing ratio of said first image data to second image data;
a selecting means for selecting at least part of bit data of said first image data and at least part of bit data of said second image data;
control means for controlling the selecting means based on an error minimizing relationship, the control means including a table having contents of a plurality of sets of bit selection data corresponding to a plurality of respective synthesizing ratios, each set of selection data being determined based on said error minimizing relationship;
a synthesizing means stored with synthesized image data of said first image data to said second image data for all combination of said selected part of bit data and said synthesizing ratio, and for outputting said synthesized image data corresponding to said selected part of bit data and said synthesizing ratio stored in said third storage means; and
wherein said error minimizing relationship is as follows:
$$(2^{\oplus a} \times C + 2^{(D-\oplus a)} \times (Cm-C))/Cm$$

where $\delta a + \delta b = D$ (D is a constant.),
$\beta = C/Cm$,
$\delta a$ denotes the error of the first image data,
$\delta b$ denotes the error of the second image data,
$\beta$ denotes the synthesizing ratio,
C denotes the control data,
Cm denotes the maximum control data.

* * * * *

UNITED STATES PATENT AND TRADEMARK OFFICE
CERTIFICATE OF CORRECTION

PATENT NO. : 5,313,226
DATED : May 17, 1994
INVENTOR(S) : Masaki TAKAKURA, Yasukuni YAMANE, and Noritoshi KANO It is certified that error appears in the above-identified patent and that said letters patent is hereby corrected as shown below:

Col. 10, line 12, please change the equation to read as follows:

-- $(2^{\delta a} \times C + 2^{(D-\delta a)} \times (Cm-C))/Cm$ --.

Signed and Sealed this

Sixth Day of September, 1994

BRUCE LEHMAN

*Attest:*

*Attesting Officer*   Commissioner of Patents and Trademarks